United States Patent
Hasselbusch et al.

(10) Patent No.: US 9,613,413 B2
(45) Date of Patent: Apr. 4, 2017

(54) METHODS AND SYSTEMS FOR DETERMINING PART WEAR BASED ON DIGITAL IMAGE OF PART

(71) Applicant: CATERPILLAR INC., Peoria, IL (US)

(72) Inventors: Michael D Hasselbusch, Metamora, IL (US); Stephen Paul Lu, Peoria, IL (US); Erich Owen Mathews, Atlanta, GA (US); Mark Steven Diekevers, Germantown Hills, IL (US); Jonathan Taylor Blocksom, Reston, VA (US); Todd R. Goins, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 761 days.

(21) Appl. No.: 14/055,663

(22) Filed: Oct. 16, 2013

(65) Prior Publication Data
US 2014/0105481 A1    Apr. 17, 2014

Related U.S. Application Data

(60) Provisional application No. 61/715,085, filed on Oct. 17, 2012.

(51) Int. Cl.
    *G06T 7/00* (2006.01)
(52) U.S. Cl.
    CPC .......... *G06T 7/0006* (2013.01); *G06T 7/0018* (2013.01); *G06T 7/0085* (2013.01); *G06T 2207/30164* (2013.01)

(58) Field of Classification Search
None
See application file for complete search history.

(56) References Cited

FOREIGN PATENT DOCUMENTS

| KR | 1020030054642 | 7/2003 |
| KR | 1020050018773 | 2/2005 |
| KR | 1020070098189 | 10/2007 |
| KR | 1020120103209 | 9/2012 |
| WO | 2011065203 | 6/2011 |
| WO | 2012113084 | 8/2012 |

OTHER PUBLICATIONS

Jianbo Zhang, Detection and Monitoring of Wear Using Imaging Methods, ISBN 90-365-2389-3, Copyright © 2006 by Jianbo Zhang, Enschede, The Netherlands, 172 pages.*

* cited by examiner

*Primary Examiner* — Tung Lau
(74) *Attorney, Agent, or Firm* — Finnegan, Henderson, Farabow, Garrett & Dunner, LLP

(57) ABSTRACT

Systems and methods are disclosed for determining part wear using a mobile device. One such exemplary method includes capturing, using the mobile device, at least one digital image of a wear part of a machine. The method further includes determining, by the mobile device and based on the at least one digital image, a degree of wear of the wear part.

7 Claims, 11 Drawing Sheets

METHODS AND SYSTEMS FOR DETERMINING PART WEAR BASED ON DIGITAL IMAGE OF PART

PRIORITY CLAIM

This application claims priority to U.S. Provisional Application No. 61/715,085, filed Oct. 17, 2012 and entitled "Methods and Systems for Determining Part Wear Based on Digital Image of Part," which is incorporated herein by reference in its entirety.

TECHNICAL FIELD

The disclosure relates generally to determining part wear and, more particularly, to methods and systems for determining part wear using at least one digital image of the part.

BACKGROUND

Machines are made up of various parts. Some machine parts wear over time as the machine is used and eventually need to be replaced. For example, a track-type tractor has track links and other parts that are subject to forces as the tractor moves material on a worksite, wearing the parts over time.

It is desirable to know the degree of wear of a part, for example, so that its remaining useful life can be determined or estimated. But it can be difficult to do so without specific knowledge or information pertaining to the part or the machine.

SUMMARY

One aspect of the disclosure relates to a method for determining part wear using a mobile device. In one embodiment, the method may include capturing, using the mobile device, at least one digital image of a wear part of a machine. The method may further include determining, by the mobile device and based on the at least one digital image, a degree of wear of the wear part.

Another aspect of the disclosure relates to a mobile device configured for determining part wear. In one embodiment, the mobile device may include a camera, an input device for receiving input from a user of the mobile device, a storage device storing an application, and a processor. The processor may be configured to execute the stored application to receive, via the input device, a command from the user to capture an image, and capture, using the camera and responsive to the command, at least one digital image of a wear part of a machine. The processor may be further configured to determine, based on the at least one digital image, a degree of wear of the wear part.

Still another aspect of the disclosure relates to a method for determining part wear using a mobile device. In one embodiment, the method may include receiving, over an electronic communication network from the mobile device, at least one digital image of a wear part of a machine. The method may further include determining, based on the at least one digital image, a degree of wear of the wear part, and sending, over the electronic communication network to the mobile device, an indication of the determined degree of wear of the wear part.

Yet another aspect of the disclosure relates to a system for determining part wear using a mobile device. In one embodiment, the system includes a network communication interface configured to communicate over an electronic communication network, a storage device storing an application, and a processor. The processor may be configured to execute the stored application to receive, over the electronic communication network from the mobile device, at least one digital image of a wear part of a machine, and to determine, based on the at least one digital image, a degree of wear of the wear part. Additionally, the processor may be configured to send, over the electronic communication network to the mobile device, an indication of the determined degree of wear of the wear part.

DETAILED DESCRIPTION

Reference will now be made in detail to exemplary embodiments, examples of which are illustrated in the accompanying figures. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of systems and methods consistent with aspects of the disclosure as recited in the appended claims.

Figure 1:
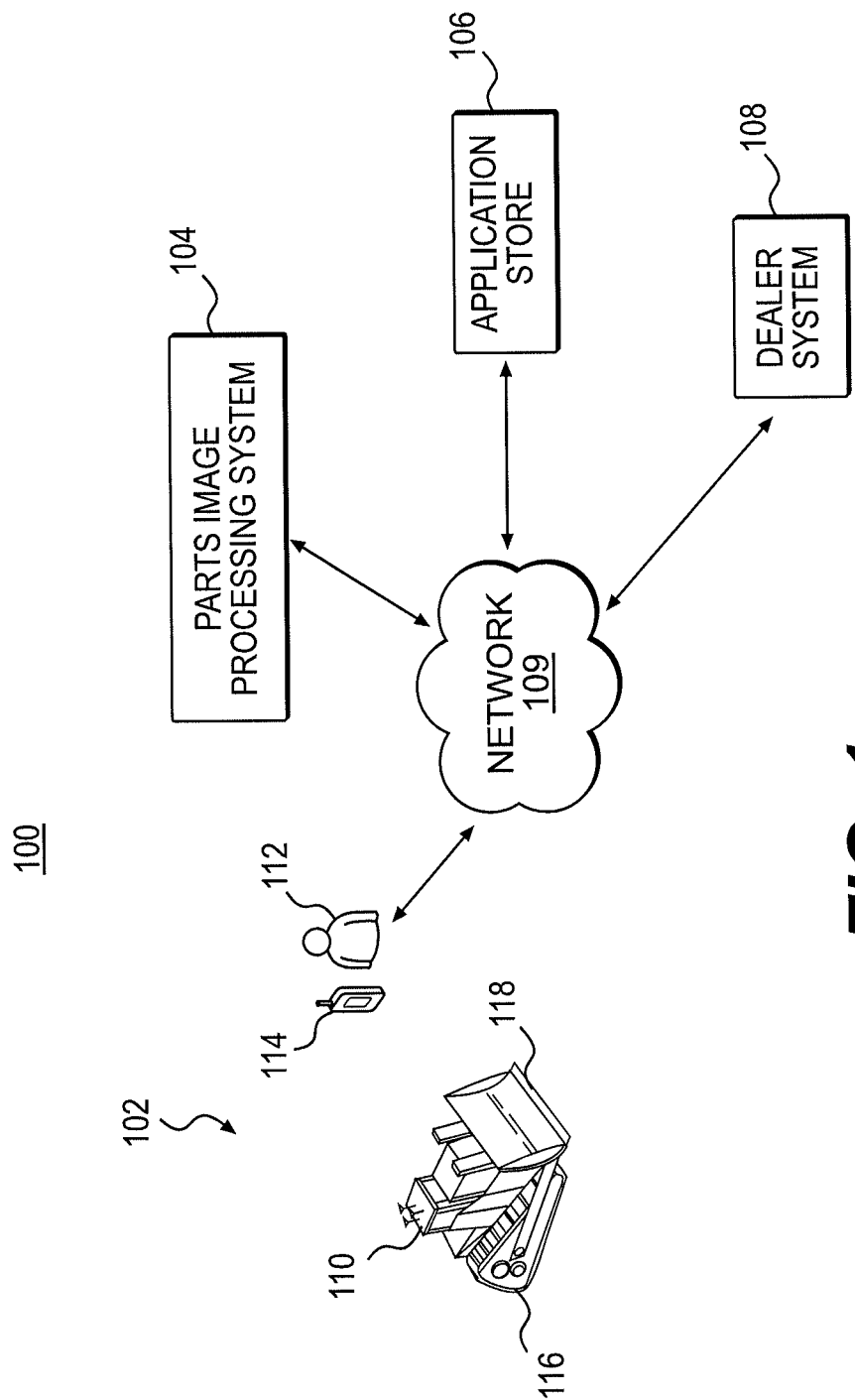
FIG. 1 is a representation of an exemplary environment for determining part wear, consistent with the disclosed embodiments.

FIG. 1 illustrates an exemplary environment 100 for determining part wear based on a digital image of the part, consistent with the disclosed embodiments. As explained below, elements of environment 100 may interact to enable a user to easily determine the degree of wear of a part of a machine, simply by capturing a digital image of the part using a mobile device. As illustrated, environment 100 may include a machine site 102. Depending upon the configuration, environment 100 may additionally include a parts image processing system 104, an application store 106, and/or a dealer system 108. Elements of environment 100 may be connected to an electronic communication network 109 over which they may communicate with one another.

At machine site 102, there may be a machine 110 as well as a user 112 carrying a mobile device 114. Machine site 102 represents any location at which machine 110 and user 112 may be present. For example, machine site 102 may be a worksite, a repair shop, a dealership, an owner's residence, a highway or road, etc. As explained in detail below, at machine site 102, user 112 may capture a digital image of a wear part of machine 110 using mobile device 114 to determine a degree of wear of the part.

Machine 110 may be one of any variety made up of individual parts. Certain parts of machine 110, more so than others, are subject to forces during operation of machine 110 that cause them to wear over time and to need replacement. For example, machine 110 may represent a work machine, such as a track-type tractor, a wheel loader, a generator set, an oil drill, or any other type of machine that performs an intensive work task. As shown in FIG. 1, a tractor, for instance, might have high-stress parts like tracks 116 made up of individual track links, a blade 118 with an edge component for moving material, and/or other parts that wear over time as the tractor goes about its various tasks. Machine 110 may also embody an industrial transport machine, such as a locomotive, a haul truck, a bus, an aircraft, or another such machine that moves people or payloads. An aircraft, for example, might have turbine fan blades, bleed ports, or other parts subject to high stresses that cause them to wear over time and need periodic replacement. Machine 110 may also embody a vehicle, such as a passenger truck or car. Such machines also have high-stress parts, such as axles or tires, that wear with use and eventually need replacing. Machine 110 may even embody a work tool, such as a saw or drill, having one or more parts, such as teeth or bits, which wear over time with use. This description sometimes refers to such parts of a machine 110 that are subject to stresses that cause to wear over time with use as "wear parts."

User 112 represents any person concerned with machine 110. For example, user 112 may be the owner or operator of machine 110. User 112 may also be a technician, repairperson, customer service representative, dealer personnel, or other serviceperson associated with machine 110. The particular nature of user 112 is not critical to the disclosed embodiments—user 112 may be any person who uses the disclosed systems and methods to determine the degree of wear of a wear part of machine 110. As mentioned above and explained in more detail below, user 112 may carry a mobile device 114 and use it to capture a digital image of a wear part of machine 110, which is used to determine its degree of wear.

Parts image processing system 104 may represent a computing system associated with an entity that makes available to user 112 the disclosed service for determining part wear as well as other related services. That entity, for instance, might be a dealer that sells machine 110 to user 112, a lessor that leases machine 110 to user 112, a manufacturer of parts for machine 110, or a seller of parts for machine 110. In other embodiments, that entity may be an insurance provider for machine 110 or user 112, a warranty servicer for machine 110, a lien holder to machine 110, or another third party having some relationship to machine 110 or user 112. As explained below in more detail, parts image processing system 104 may have any number or combination of computing elements enabling it to communicate, store, and process data to carry out the disclosed techniques. For example, parts image processing system 104 may embody a server computer or a collection of server computers configured to perform the described techniques.

Generally, parts image processing system 104 may interact and communicate with other elements of environment 100, such as mobile device 114 and dealer system 108, to process a captured digital image of a wear part of machine 110 and determine its wear. Depending upon the embodiment, parts image processing system 104 may also perform other parts-related services, such as notifying dealer system 108 when it is determined that a part of machine 110 is sufficiently worn, so that the dealer may take action if warranted. These and other characteristics of parts image processing system 104 are discussed in detail below.

Depending upon the configuration of environment 100, parts image processing system 104 may have different roles or different degrees of involvement in carrying out the disclosed techniques. For example, environment 100 may be configured as a "server-based" environment or a "cloud" environment that performs the disclosed part-wear-determination techniques as part of a service over network 109. In such a server or cloud environment, parts image processing system 104 (i.e., the server or "cloud"), for example, may receive digital images of wear parts from mobile device 114 over network 109. Parts image processing system 104 may then process the images to determine the degree of wear of the parts, and return results of the processing to mobile device 114 over network 109. Thus, in a server or cloud environment, parts image processing system 104 may do the "heavy lifting" in terms of computing, while mobile device 114 may operate as a lightweight portal (e.g., application or browser) that allows user 112 to access the services of parts image processing system 104 over network 109. Alternatively, environment 100 may be configured as a "client-side" environment in which mobile device 114 performs the bulk of the processing locally. In such configurations, parts image processing system 104 may have a reduced role or may even be omitted entirely. This description contemplates both configurations for environment 100 and provides specific examples of each below.

Application store 106 may represent a computing system of an entity that makes available software applications (e.g., "apps") to mobile device 114 via download over network 109. That entity, for instance, might be a manufacturer of mobile device 114, a wireless service provider providing wireless services to mobile device 114, or a developer of applications for mobile device 114. As with parts image processing system 104, application store 106 may have any number or combination of computing elements enabling it to communicate, store, and process data to carry out the disclosed techniques. In one embodiment, application store 106 may store a mobile application (discussed below) that executes on mobile device 114 to enable user 112 to capture an image of a wear part of machine 110 and determine its degree of wear. User 112 may download the application to mobile device 114 from application store 106 over network 109. In a "client-side" environment, however, parts image processing system 104 might offer the image-processing tasks as a service that mobile device 114 accesses through a web browser or web application downloaded from parts image processing system 104. In such a configuration, application store 106, and perhaps the mobile application, may be omitted.

Dealer system 108 may represent a computing system associated with a dealer that sells or rents machine 110 or parts for machine 110. The dealer may have a relationship with user 112, who may be a customer or a potential customer, and may have an interest in knowing the status of machine 110. For example, the dealer may desire to know when a wear part of machine 110 has become sufficiently worn so that it can inspect or service machine 110 and potentially sell replacement parts or services to user 112. Like other elements of environment 100, dealer system 108 may have any number or combination of computing elements enabling it to communicate, store, and process data to carry out the disclosed techniques. Among other things, dealer system 108 may receive notifications, such as e-mails or text messages, from other elements of environment 100, such as mobile device 114 or parts image processing system 104, based on a determination that a wear part of machine 110 is sufficiently worn. In response to such notifications, dealer system 108 may initiate responses to address potential concerns with respect to a worn part. For example, dealer system 108 may contact user 112 to bring machine 110 in for inspection or service, may arrange for a technician of the dealer to visit machine site 102 and inspect or service machine 110, or may prompt user 112 (via mobile device 114) to order a replacement for the worn part and allow user 112 to order the same. These and other characteristics of dealer system 108 are discussed in detail below.

Network 109 may represent any type or combination of electronic communication network(s) configured to communicate data between nodes connected to network 109. For example, network 109 may represent the Internet, an Ethernet, a local area network (LAN), a wide area network (WAN), a personal area network (PAN), cellular network, a public switched telephone network (PSTN), or any combination thereof. In one embodiment, network 109 may include a mobile network and related infrastructure operable to provide Internet connectivity to mobile device 114, such as a $2^{nd}$ Generation (2G) cellular communication network, a $3^{rd}$ Generation (3G) cellular communication network, a $3^{rd}$ Generation Long Term Evolution (LTE) network, or a $4^{th}$ Generation (4G) cellular communication network.

As mentioned, user 112 carries a mobile device 114 at machine site 102 and uses it to capture a digital image of a wear part of machine 110, such as a link of tracks 116, which is used to determine its degree of wear. To that end, mobile device 114 may embody any type of portable computing device equipped with a camera function and configured to communicate data over network 109. For instance, mobile device 114 may be a smartphone, a cell phone, a tablet computer, a personal digital assistant (PDA), a network-enabled digital camera, or other such portable computing device.

Figure 2:
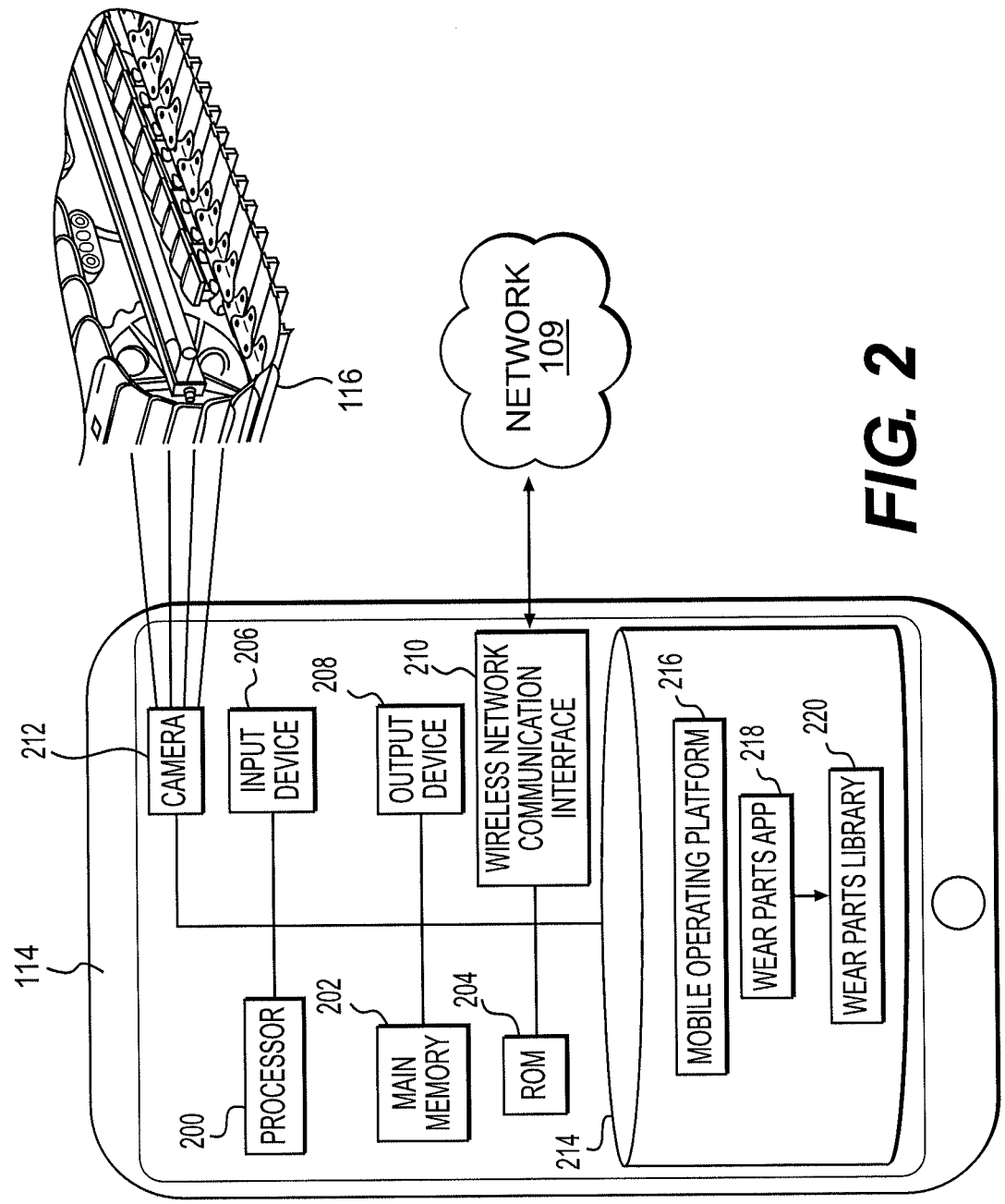
FIG. 2 is a representation of an exemplary mobile device of the environment.

FIG. 2 illustrates an exemplary embodiment of mobile device 114 in detail. As shown, mobile device 114 contains computing components that enable it to transmit/receive, process, and store data. For example, mobile device 114 may have a processor 200, a main memory 202, a read-only memory (ROM) 204, an input device 206, an output device 208, a wireless network communication interface 210, a camera 212, and a storage device 214, among other components.

Processor 200 may embody any general-purpose or special-purpose computer microprocessor configured to execute computer program instructions, applications, or programs stored in main memory 202 and/or storage device 214. Main memory 202 may include, for example, a random access memory (RAM) or other type of dynamic or volatile storage device. Main memory 202 may store information, instructions, programs, or applications loaded from ROM 204 or storage device 214 for execution by processor 200.

ROM 204 may be any static or nonvolatile memory storage device configured to store computer program instructions, programs, or applications for loading into main memory 202 and execution by processor 200. For example, ROM 204 may be a programmable read-only memory (PROM), such as an erasable programmable read-only memory (EPROM), an electronically erasable programmable read-only memory (EEPROM), a one-time programmable read-only memory (OTP NVM), a field-programmable read-only memory (FPROM), or a Flash memory device.

Input device 206 may embody one or more mechanisms that permit user 112 to input information or commands to mobile device 114. For example, input device 206 may include a keyboard, a touch screen, a touch pad, a mouse, a stylus, a voice-recognition device, a biometric-recognition device, an accelerometer, a microphone, or any other type of device for enabling user input to a computing device.

Output device 208 may include one or more mechanisms that output information to user 112 of mobile device 114. For example, output device 208 may include a display device, a speaker, a vibrating device, a lighting device or lamp, or any other type of device for providing output to a user of a computing device.

Wireless network communication interface 210 may include any device or system enabling mobile device 114 to communicate voice and/or data over electronic communication network 109. For example, wireless network communication interface 210 may include one or more radio antennas, transceivers, and/or other components for wireless communication. Such wireless networks may include, for example, a cellular network, such as a $2^{nd}$ Generation (2G™), a $3^{rd}$ Generation (3G™), a $3^{rd}$ Generation Long Term Evolution (LTE™) network, or a $4^{th}$ Generation (4G™) network; a local area network (LAN), such as a Wi-Fi network (e.g., IEEE 802.11 protocol), or a WiMAX™ network (e.g., IEEE 802.16 protocol); a picocell or femtocell network (e.g., a Bluetooth™ or other unlicensed radio spectrum network); or other type of electronic communication network 109. Wireless network communication interface 210 may include any components known in the art necessary to communicate on such network(s).

Camera 212 may embody any image-detection device mounted to or otherwise associated with mobile device 114 that captures an image within a view of mobile device 114. For example, camera 212 may be a conventional visual-light-spectrum camera device mounted on mobile device 114 and operable to capture and store a digital image in response to user 112 providing appropriate input to input device 206, such as pressing a "soft" camera button displayed on a touch screen. Camera 212 may have an embedded image sensor (not shown) made up sensor pixels, such as a charge-coupled device (CCD). The sensor pixels may convert incident electromagnetic radiation focused thereon by a lens (not shown) into electrical charges for storage as a digital image. In other embodiments, camera 212 may be an infrared camera device or an X-ray camera device. Indeed, camera 212 may embody any type of device configured to capture electromagnetic radiation as a digital image.

Consistent with the disclosed embodiments, user 112 may orient mobile device 114 so that a wear part (e.g., a link of tracks 116) is within a field of view of camera 212, and may provide input to input device 206 to capture a digital image thereof. As explained below, mobile device 114 and/or parts image processing system 104, depending upon the embodiment, may then process the digital image to determine the degree of wear of the part.

Storage device 214 may include any type of mass data storage device on mobile device 114. For example, storage device 214 may embody a solid-state drive (SSD) or a magnetic data storage device, such as a hard drive. When user 112 captures a digital image with camera 212, processor 200 may store the image in storage device 214. Additionally, as shown in FIG. 2, in a "client-side" environment 100, storage device 214 may store a mobile operating platform 216, as well as a wear parts application 218 and an associated wear parts library 220.

Mobile operating platform 216 may embody any type of software operating environment for a mobile computing device in which one or more mobile applications executes. For example, mobile operating platform 216 may embody the Nokia Symbian™ operating environment, the Apple IOS™ operating environment, the RIM Blackberry™ operating environment, the Google Android™ operating environment, the Windows Mobile™ operating environment, or another graphical operating environment configured to execute on a mobile computing device and support execution of mobile applications.

Wear parts application 218 may embody an application configured to execute on mobile operating platform 216 to perform functions for determining the degree of wear of wear parts of machine 110 based on digital images captured with camera 212. In one embodiment, mobile device 114 may download wear parts application 218 (and wear parts library 220) from application store 106, over network 109. For example, user 112 may register for a wear parts service with dealer system 108 and create an account for user 112 and/or one or more machines 110. As part of this process, user 112 may download and use wear parts application 218 and wear parts library 220 on a free basis, a subscription basis, or a one-time payment basis. Alternatively, user 112 may download and use wear parts application 218 and wear parts library 220 without registering or creating an account with the dealer.

Wear parts library 220 may contain wear parts information for a variety of wear parts of a variety of different machines. In one embodiment, the wear parts information may be indexed by machine model, part name, and/or part model number, so that wear parts library 220 can be queried to identify the wear parts information for a desired wear part. In one embodiment, the wear parts information may include model information for the wear parts. The model information may specify, for example, known features (e.g., dimensions and geometry) of wear parts, and may contain information that enables mobile device 114 to identify the known features of the wear parts in a digital image thereof. The model information may also identify wear edges of the wear parts and may contain information enabling mobile device 114 to identify them in digital images of the wear parts. As used in this description, a "wear edge" refers to a surface of a wear part that is typically subject to forces during use, causing it to wear over time and eventually requiring the part to be replaced. For example, as explained below, an engagement surface of a tractor track link that engages the wheels of the tractor undercarriage is a wear edge.

The model information may also include dimension information and/or design specification information of the wear parts. Mobile device 114 may use the dimension information and/or design specification information, among other reasons, to orient digital images of wear parts so that accurate measurements can be taken from them, and to calibrate measurements of wear parts made from digital images.

Additionally, wear parts library 220 may contain wear tables that enable mobile device 114 to determine the degree of wear of wear parts based on measurements of the wear parts taken from digital images thereof. In one embodiment, the wear tables may define a degree of wear of a wear part as a function of a measured dimension of a wear edge of the wear part, such as a measured distance from a known feature of the wear part to the wear edge. As an example, a wear table for a track link may contain the following information:

| Track Link Wear Table | |
| --- | --- |
| Distance from Known Feature to Wear edge | Degree of Wear |
| 100 mm | 0% |
| 98 mm | 10% |
| 96 mm | 20% |
| 94 mm | 30% |
| 92 mm | 40% |
| 90 mm | 50% |
| 88 mm | 60% |
| 86 mm | 70% |
| 84 mm | 80% |
| 82 mm | 90% |
| 80 mm | 100% |

As can be seen from the exemplary wear table, it defines a degree of wear of the track link, in terms of a percentage, as a function of a measured dimension of a wear edge of the track link—in this case, a distance from a known feature of the track link to a wear edge thereof. In this particular example, if the measured distance from the known feature to the wear edge of the track link is 94 mm, then the track link is 30% worn, meaning that it has 70% of its useful life remaining before it should be replaced. Over time, as the track link wears, that distance may eventually reduce to 80 mm, meaning that the track link has no remaining useful life and should be replaced immediately. It is noted that a wear table need not take the form of a "table," specifically. For example, a wear table could be an equation, formula, mathematical model, or other means for computing a degree of wear as a function of a measured dimension of a wear edge of a wear part.

Figure 3:
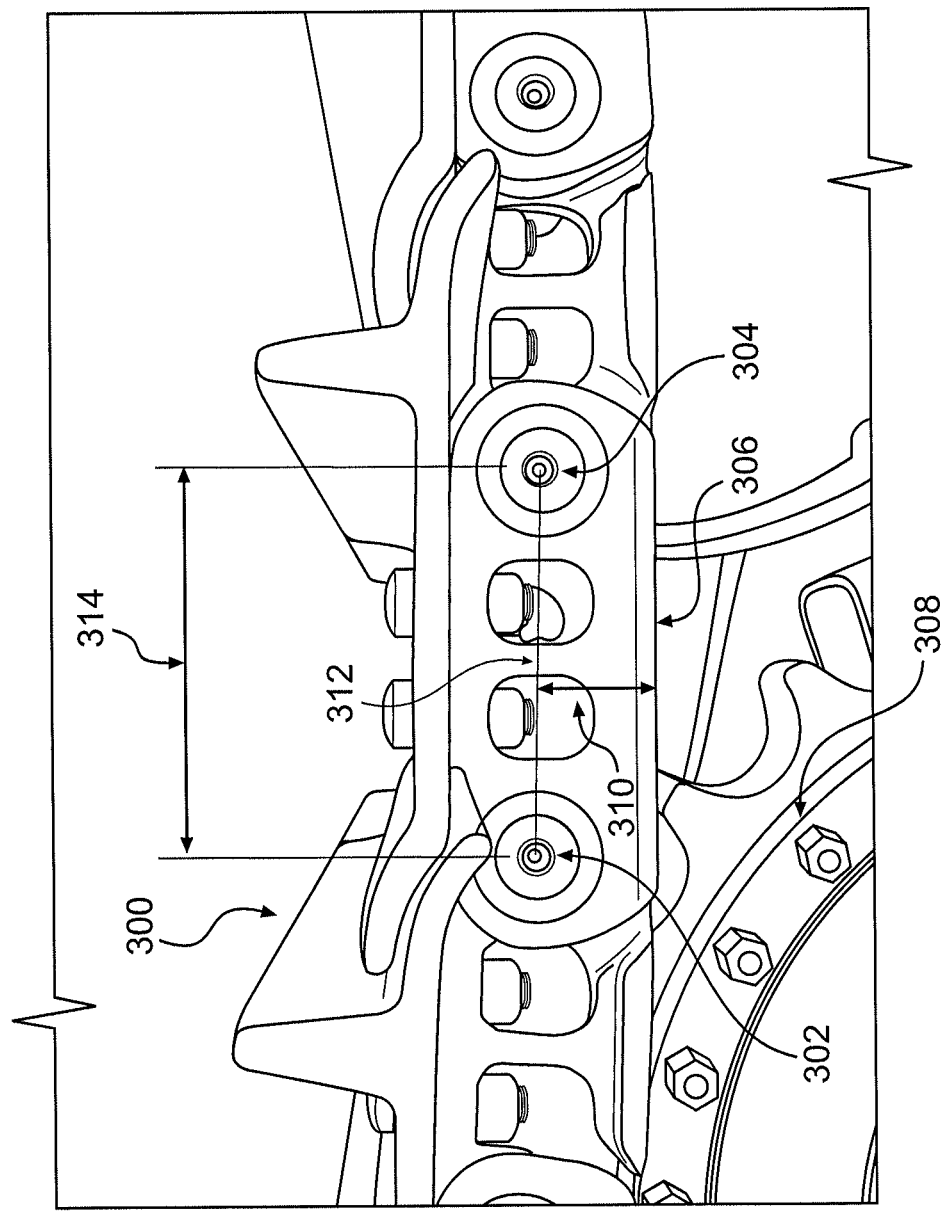
FIG. 3 is a representation of an exemplary wear part—a track link.

FIG. 3 is a representation of an exemplary track link 300 with certain characteristics highlighted to illustrate the application of the wear table and other information stored in wear parts library 220. As shown in the figure, track link 300 may have known features such as two pins holes 302, 304 through which pins are inserted to connect track link 300 to neighboring links in the track. Track link 300 may also have a wear edge 306 that engages a wheel 308 of the tractor as it travels. Over time, as operation of the tractor creates friction forces between wheel 308 and track link 300 that wear down wear edge 306, the distance 310 between wear edge 306 and a line 312 connecting the centers of pin holes 302, 304 decreases. That is, track link 300 wears as the perpendicular distance 310 between the centers of pin holes 302, 304 and wear edge 306 decreases. Pin holes 302, 304 are known features of track link 300 in the sense that they remain in the same position throughout the life of track link 300. Accordingly, they may serve as a baseline against which to measure the degree of wear of wear edge 306.

Known features of a wear part, such as pin holes 302, 304, may also serve as "landmarks" for orienting a digital image of the wear part. To this end, as explained above, the model information in wear parts library 220 may identify such known features of the wear parts and may contain information enabling mobile device 114 to identify them in digital images of the wear parts. Thus, even if user 112 captures a digital image of a wear part that is rotated, skewed, off-center, etc., the model information may be used to correct the orientation of the image so that accurate measurements can be taken from it. For example, if user 112 captures a digital image of track link 300 that is rotated 30 degrees clockwise from the model, processor 200 may identify the locations of the centers of pin holes 302, 304 in the digital image, compare the identified locations of the centers of pin holes 302, 304 in the image to their corresponding locations in the model for track link 300 and, based on that comparison, rotate the image 30 degrees counterclockwise so that accurate measurements of track link 300 can be made from the digital image. While use of the distance 314 between the centers of pin holes 302, 304 is discussed above for calibrating measurements, it is also contemplated that other known features of a wear part may be used for the same purpose. For example, a known diameter of a pin hole 302, 304 or other known features of the wear part may be utilized to calibrate measurements taken from a digital image of the wear part.

Known features of a wear part, such as pin holes 302, 304, may also serve as bases for calibrating measurements taken from a digital image of the wear part. For example, referring to FIG. 3, a distance 314 between the centers of pin holes 302, 304 on a particular track link 300 may be known (from the design specifications) to be 300 mm. To this end, as mentioned above, wear parts library 220 may contain dimension information and/or design specification information for wear parts. Using this information, mobile device 114 may be configured to calibrate digital images of wear parts and/or measurements taken from them. In one embodiment, mobile device 114 may be configured to analyze a digital image of a wear part to determine the distance, in pixels, between two known features of the wear part. Mobile device 114 may be configured to divide the distance between the two known features listed in the design specifications by the determined pixel distance to obtain a calibration factor (distance per pixel) for the digital image. For example, if mobile device 114 determines that there are 1000 pixels between the centers of pin holes 302, 304 in a particular digital image of track link 300, and the pin holes 302, 304 are known to be 300 mm apart from the design specifications, mobile device 114 may calculate a calibration factor of 0.33 mm/pixel for that image. Subsequent pixel-distance measurements of track link 300 taken from that digital image may be multiplied by the calibration factor to convert them to their distance in millimeters.

In a "client-side" environment, processor 200 may be configured to perform various functions relating to determining the degree of wear of wear parts from digital images thereof. Generally, processor 200, executing wear parts application 218 on mobile operating platform 216, may be configured to orient a digital image of a wear part so that it corresponds to a model of the wear part contained in wear parts library 220 and accurate measurements can be taken from it. Processor 200, executing wear parts application 218 on mobile operating platform 216, may also be configured to calibrate the digital image of a wear part so that pixel-based measurements of the wear part taken from the image can be converted to real-world measurements (e.g., mm). Additionally, processor 200, executing wear parts application 218 on mobile operating platform 216, may be configured to analyze a digital image of a wear part to measure a pixel distance from a known feature of the wear part to a wear edge of the wear part. Processor 200 may additionally be configured to convert the pixel distance to a real-world measurement (e.g., mm) using a calibration factor determined when calibrating the image. Additionally, processor 200, executing wear parts application 218 on mobile operating platform 216, may be configured to determine the degree of wear of the wear part from the measurement of the distance between the known feature and the wear edge using a wear table stored in the wear parts library 220. Processor 200, executing wear parts application 218 on mobile operating platform 216, may also be configured to output an indication of the degree of wear to user 112 via output device 208. These and other functions and configurations of processor 200 are explained in greater detail below with respect to FIGS. 5-9.

As mentioned above, environment 100 may include parts image processing system 104 if a "server" or "cloud" configuration is desired. (But parts image processing system 104 may be omitted, or its role limited, in a "client-side" environment.) If parts image processing system 104 is used, it may have similar components and functions as mobile device 114 in a client-side environment. In this configuration, wear parts application 218 and wear parts library 220 may be omitted from mobile device 114, and their functionality replaced with corresponding components and functionality on parts image processing system 104. For example, wear parts application 218 may provide a web-based application or site which mobile device 114 accesses over network 109 via a web browser. Using the web-based application or site, mobile device 114 may capture and transmit a digital image of a wear part to parts image processing system 104 over network 109. And parts image processing system 104 may process the digital image to determine the degree of wear of the wear part, send results to mobile device 114 over network 109 for presentation to user 112, send a notification to dealer system 108, etc.

Figure 4:
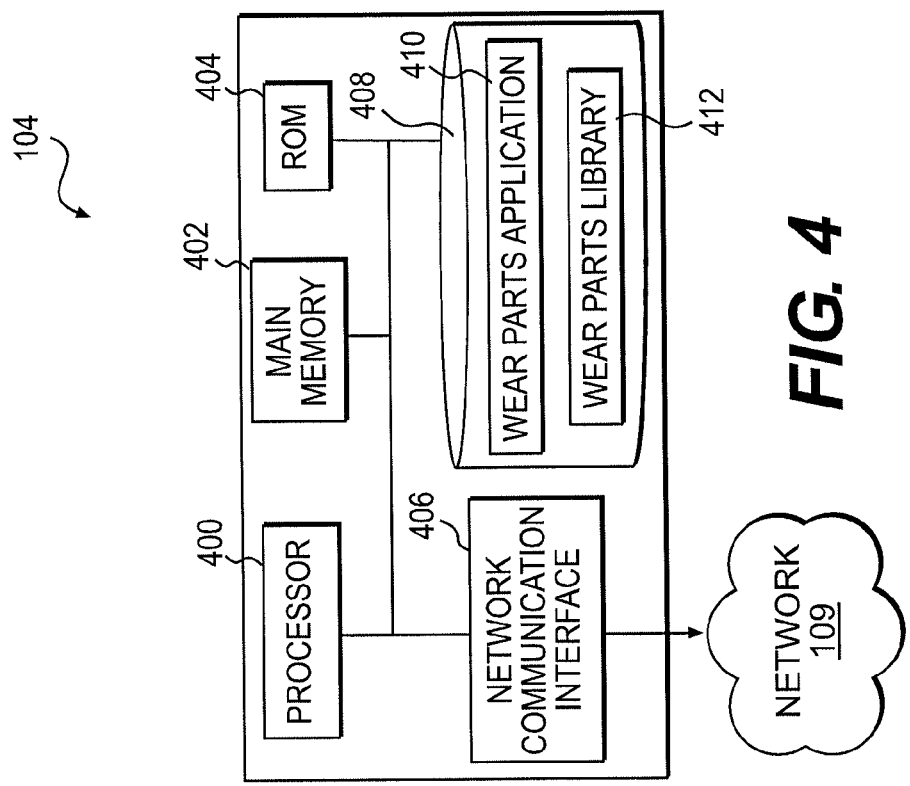
FIG. 4 is a representation of an exemplary parts image processing system of one embodiment of the environment consistent with the disclosure.

FIG. 4 illustrates a representation of components of parts image processing system 104. As with other elements of environment 100, parts image processing system 104 may have any number or combination of computing elements enabling it to communicate, store, and process data to carry out the disclosed techniques. For example, parts image processing system 104 may include one or more server computers having a processor 400, a main memory 402, a read-only memory (ROM) 404, a network communication interface 406 for communicating on network 109, and a storage device 408, which may have a similar makeup to the components discussed above with respect to FIG. 2.

Within storage device 408, there may be stored a wear parts application 410 and a wear parts library 412, which may have a similar makeup and perform similar functions as wear parts application 218 and wear parts library 220 of mobile device 114, discussed above. In this case, however, wear parts application 410 may be a web-based application or site, which mobile device 114 accesses over network 109, instead of a client-side application.

Figure 5:
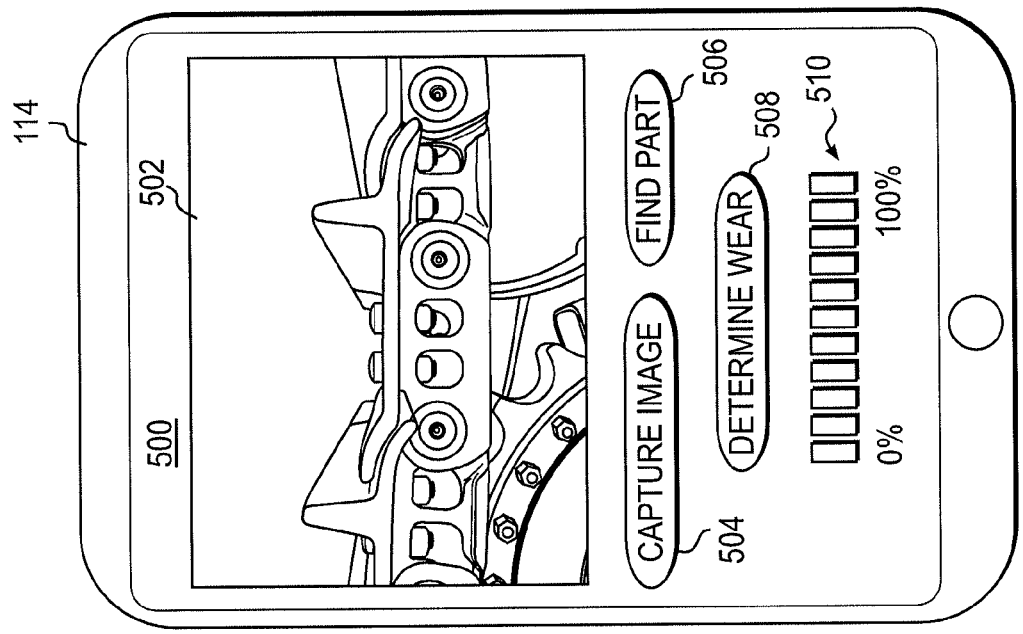
FIG. 5 is a representation of an exemplary graphical user interface (GUI) display of the mobile device, consistent with the disclosed embodiments.

FIG. 5 is a representation of an exemplary wear parts application graphical user interface (GUI) display 500, displayed on mobile device 114. In a client-side environment, GUI display 500 may be displayed on output device 208 when user 112 launches wear parts application 218 stored on mobile device 114 and processor 200 executes the same. In a server or cloud environment, GUI display 500 may be displayed on output device 208 when user 112 accesses a web-based wear parts application 410 of parts image processing system 104 over network 109 using the mobile device's web browser.

As illustrated in the figure, GUI display 500 may include an image capture window 502 that displays a digital image of the field of view of camera 212. Holding mobile device 114, user 112 at machine site 102 may orient mobile device 114 and camera 212 so that a wear part of machine 110 (e.g., track link 300) is within the field of view of camera 212 and displayed in image capture window 502. In some embodiments, image capture window 502 may have a frame, outline, or other means (not shown) of illustrating to user 112 how to orient the wear part in image capture window 502 so that an appropriate digital image of the wear part can be captured.

GUI display 500 may further include a capture image interface element 504, such as a "soft" button. When user 112 selects capture image interface element 504, processor 200 may control camera 212 to capture the digital image displayed in image capture window 502. Processor 200 may also store the digital image in storage device 214.

GUI display 500 may include a find part interface element 506, which may also be a "soft" button, for example. When user 112 selects find part interface element 506, processor 200 may access wear parts library 220 and enable user 112 to search for and identify the particular wear part of which user 112 has or intends to capture an image. For example, processor 200 may prompt user 112 to enter the model of machine 110, the name of the wear part, or the model number of the wear part into input device 206. Processor 200 may then query wear parts library 220 based on the entered information to obtain a search results list of one or more candidate wear parts, and may prompt user 112 to select a wear part from the list. User 112 may then identify and select the subject wear part from the list. Responsive to the selection, processor 200 may access the relevant model information, wear table(s), or other wear parts information stored in wear parts library 220 for the selected wear part.

GUI display 500 may also include a determine wear interface element 508, which may also be a "soft" button, for example. When user 112 selects determine wear interface element 508, processor 200 may determine the degree of wear of the wear part from the digital image. Briefly, responsive to selection of determine wear interface element 508, processor 200 may (optionally) orient the digital image of the wear part so that it corresponds to the accessed model of the wear part and accurate measurements can be taken from it. Processor 200 may also calibrate the digital image of the wear part so that pixel-based measurements of the wear part taken from the digital image can be converted to real-world measurements (e.g., mm). Additionally, processor 200 may analyze the digital image of the wear part to measure a pixel distance from a known feature of the wear part to a wear edge of the wear part. Processor 200 may additionally convert the pixel distance to a real-world measurement (e.g., mm) using a calibration factor determined when calibrating the image. Additionally, processor 200 may determine the degree of wear of the wear part from the measurement of the distance between the known feature and the wear edge using the accessed wear table for the wear part. This description explains these tasks in greater detail below with respect to the flowcharts of FIGS. 6-9. In some embodiments, processor 200 may initially perform image processing on the captured digital image to determine whether it is suitable for taking measurements of the wear part. If processor 200 determines that the image is not suitable, processor 200 may prompt user 112 to capture a new image.

As shown in FIG. 5, GUI display 500 may further include a wear indicator interface element 510 that indicates the degree of wear of the wear part, as determined from the digital image. In one embodiment, wear indicator interface element 510 may be a meter, gauge, graph, or other graphic that processor 200 animates to convey to the user the degree of wear of the wear part. For example, wear indicator interface element 510 may indicate the degree of wear as a percentage (0-100%), a color code (e.g., green-red), or a scale (e.g., 1-10). In one embodiment, if processor 200 determines that the degree of wear is above a threshold (e.g., 70%), processor 200 may send a notification (e.g., a text message or e-mail) to dealer system 108. The notification may contain, for example, the identity of user 112, machine 110, the wear part, the degree of wear, and/or other information that apprises the dealer of the situation so that the dealer can take further action, if warranted.

Figure 6:
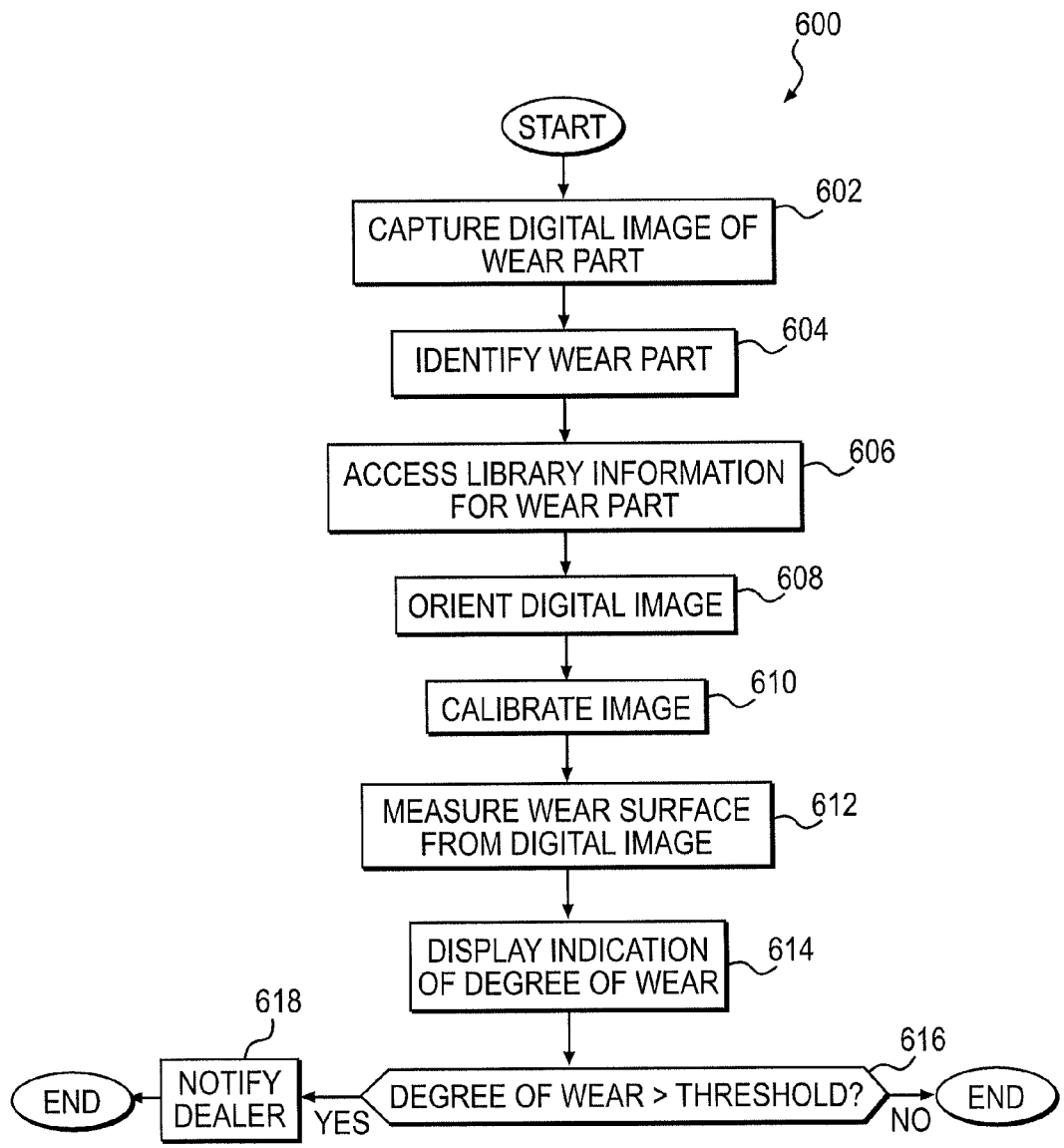
FIG. 6 is a flowchart of an exemplary method for determining the degree of wear of a wear part from a digital image, consistent with the disclosed embodiments.

FIG. 6 is a flowchart illustrating an exemplary method 600 for determining the degree of wear of a wear part from a digital image, consistent with the disclosed embodiments. In a "client-side" environment 100 in which mobile device 114 (rather than parts image processing system 104) handles image processing, processor 200 of mobile device 114 may perform method 600 when executing wear parts application 218 on mobile operating platform 216. It is noted that, depending upon the desired implementation, steps of method 600 may be performed in different orders or even omitted entirely. The steps of method 600 are intended to illustrate potential embodiments consistent with the disclosure rather than to limit the scope of the disclosure in any way.

In step 602, mobile device 114 may capture a digital image of a wear part of machine 110. For example, user 112 at machine site 102 may have a concern that a track link 300 of machine 110 is worn, and may select and launch wear parts application 218 on his or her mobile device 114. When GUI display 500 is up, user 112 may orient mobile device 114 such that track link 300 is within the field of view of camera 212 and displayed inside a frame of image capture window 502. User 112 may then capture a digital image of track link 300 by selecting capture image interface element 504 of GUI display 500. In response, processor 200 may control camera 212 to capture the digital image and store it in storage device 214 and/or in memory for processing.

In step 604, mobile device 114 may identify the wear part. For example, user 112 may select find part interface element 506 of GUI display 500. Processor 200 may display a prompt, such as a text entry field, drop-down menus, or other user interface element, allowing user 112 to provide input to identify the particular wear part of which user 112 has captured an image—in this example, track link 300. User 112 may input the model of machine 110, the name of the wear part, the model number of the wear part, or other information identifying the wear part. Processor 200 may then query wear parts library 220 based on the entered information to identify wear part(s) that match the query. Processor 200 may prompt user 112 to select a wear part from a list of search result(s) containing candidate wear part(s). User 112 may then identify and select track link 300 from the list using input device 206.

In step 606, mobile device 114 may access information in wear parts library 220 associated with the selected wear part. For example, processor 200 may access in wear parts library 220 the model information, dimension and design specification information, or wear table(s) for the selected wear part—in this example, track link 300.

In some embodiments, in step 608, mobile device 114 may orient the digital image of the wear part captured in step 602 to match the model information for the wear part, so that accurate measurements can be taken from it. Processor 200 may use any number of image-processing techniques for orienting the image. For example, processor 200 may do so by analyzing the model information for the wear part to identify the position/orientation of known features of the wear part in the model, analyzing the digital image to identify the position/orientation of the known features of the wear part in the image, and comparing the two. Based on the comparison, processor 200 may determine a difference in the position/orientation of points in the digital image relative to the position/orientation of points in the model information. Processor 200 may then change the position/orientation of the points in the digital image based on the difference so that they match the position/orientation of the points in the model. This may involve, for example, zooming, rotating, skewing, or shifting in the X, Y, or Z direction the coordinates of points in the digital image so that they match the model.

For instance, in the example of the track link 300 wear part, processor 200 may analyze the digital image to determine the position/orientation of pin holes 302, 304 in the digital image, determine the position/orientation of pin holes 302, 304 specified in the model information for track link 300, and compare the two to determine a difference in the position/orientation of the pin holes 302, 304 in the digital image relative to their position/orientation in the model. Processor 200 may then change the coordinates of points in the digital image based on the difference so that their position/orientation is the same as in the model information.

As mentioned above, in some embodiments, step 608 may be unnecessary and omitted. For example, method 600 may identify the wear part (step 604) before capturing the digital image of the wear part (step 602). In this scenario, processor 200 may have already accessed the model information for the wear part in the wear parts library 220. And the model information may include, for example, a frame or outline (not shown) of the wear part that defines the correct orientation that the wear part should have when captured in a digital image. Processor 200 may display the frame or outline in image capture window 502 to illustrate the correct orientation to the user 112. With the visual aid of the frame or outline, user 112 may orient mobile device 114 (and camera 212) with respect to machine 110 such that the wear part displayed in the digital image is located within the frame or outline. In this manner, when user 112 captures the digital image of the wear part, the image may already have the correct orientation indicated by the model information for the wear part and not require the reorientation of step 608.

Figure 7:
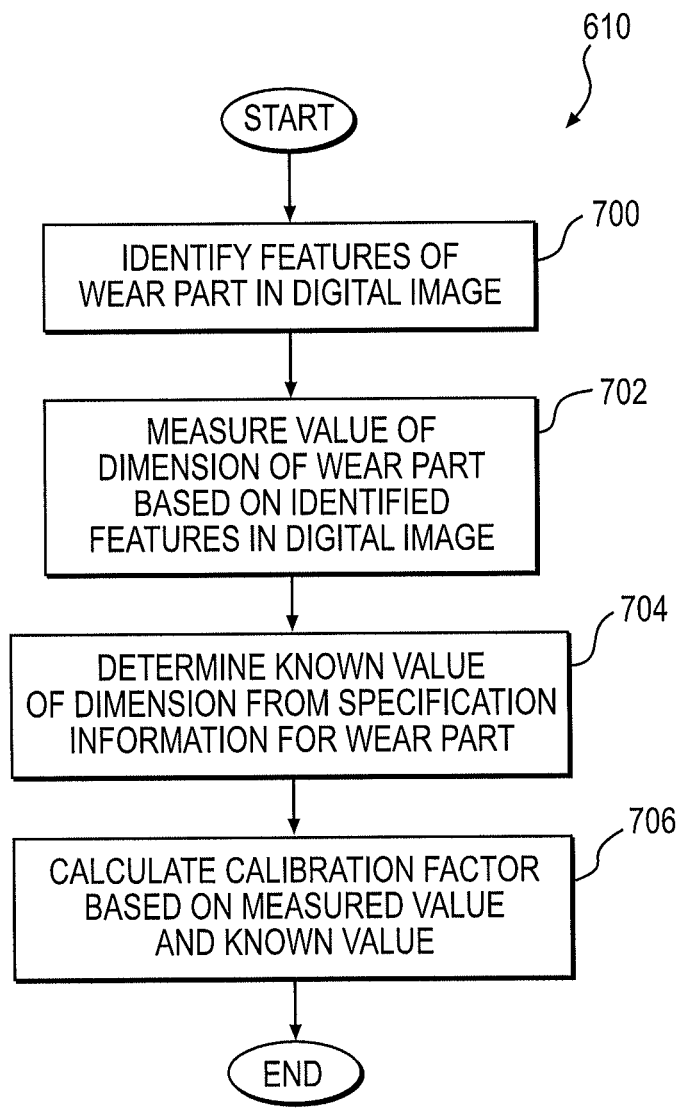
FIG. 7 is a flowchart of an exemplary step of the method—calibrating a captured digital image of a wear part—consistent with the disclosed embodiments.

In step 610, mobile device 114 may calibrate the captured digital image so that accurate measurements can be made from it, as described above. FIG. 7 is a flowchart illustrating step 610 in detail. Generally, processor 200 may calibrate the digital image by measuring a dimension of the wear part from the digital image and comparing the measured dimension to the known dimension of the wear part indicated by the model information for the wear part.

As part of calibrating the digital image, in step 700, processor 200 may identify features of the wear part in the digital image. For instance, the model information for the wear part may indicate the general location (e.g., x-y coordinates) in which one would expect to find certain features of the wear part in a correctly oriented digital image. And processor 200 may process the digital image to identify them and determine their precise location in the digital image. In the example of a track link 300, processor 200 may process the digital image to identify pin holes 302, 304, or the centers thereof. Depending on the type of wear part, however, different types of wear part features may be identified.

In step 702, processor 200 may measure a value of a dimension of the wear part based on the features of the wear part identified in the digital image. For example, in one embodiment, processor 200 may measure a distance in pixels between the identified features. In the case of track link 300, for instance, processor 200 may determine the distance 314 between the centers of pin holes 302, 304 by counting or otherwise determining the number of pixels between the centers of pin holes 302, 304 in the digital image.

In step 704, processor 200 may determine a known value of the dimension from the specification information for the wear part. For example, in the case of track link 300, the model information accessed in step 606 may contain specification information indicating that the actual distance 314 between the centers of pin holes 302, 304 is 300 mm.

In step 706, processor 200 may calculate a calibration factor for the digital image based on the measured value of the dimension of the wear part and on the known value of the dimension of the wear part. In one embodiment, processor 200 may divide the known value (e.g., units of mm) of the dimension of the wear part by the measured value (e.g., units of pixels) of the dimension of the wear part to obtain the calibration factor (e.g., units of mm/pixel). For example, in the case of track link 300, processor 200 may measure a distance 314 of 1,000 pixels between the centers of pin holes 302, 304 in the digital image of track link 300, and may determine from the specification information for track link 300 that they are actually 300 mm apart. Based on these values, processor 200 may calculate a calibration factor of 0.333 mm/pixel (i.e., 300 mm/1000 pixels).

Figure 8:
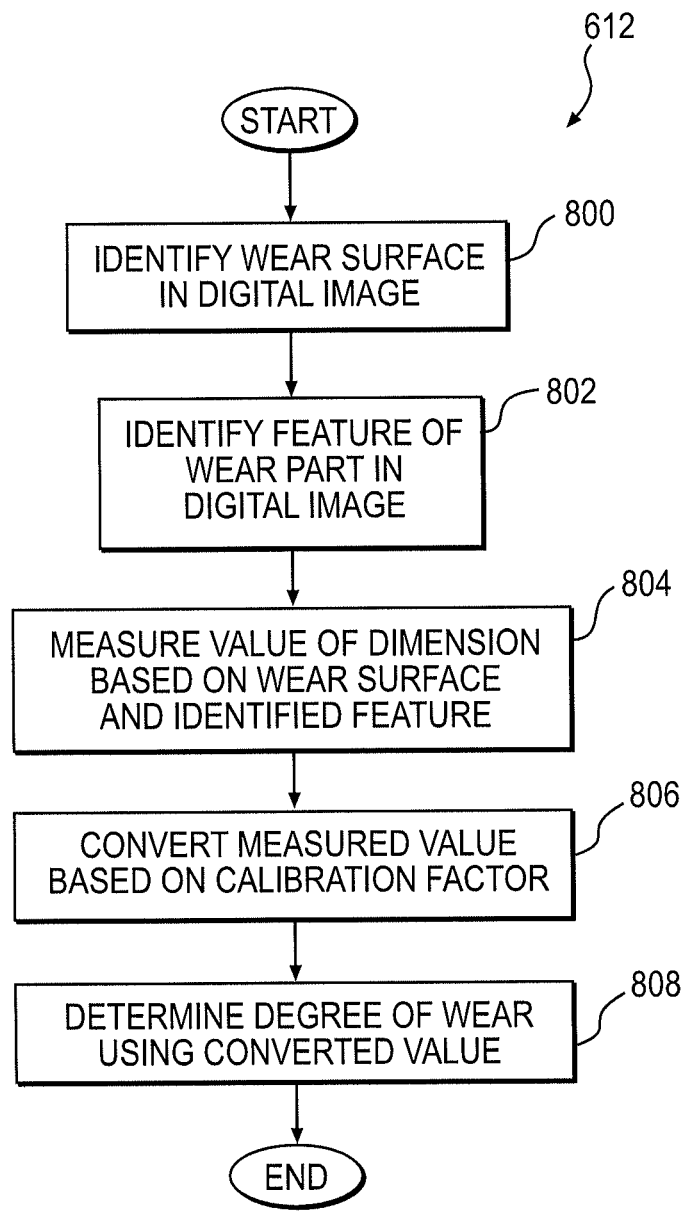
FIG. 8 is a flowchart of another exemplary step of the method—measuring a wear edge of a wear part from the digital image—consistent with the disclosed embodiments.

Returning to FIG. 6, in step 612, mobile device 114 may measure a wear edge of the wear part from the digital image to determine the degree of wear of the wear part. FIG. 8 illustrates a flowchart showing step 612 in detail. Generally, processor 200 may measure a wear edge of the wear part from the digital image and compare that measurement to a wear table for the wear part to determine the degree of wear of the wear part.

In step 800, processor 200 may identify, in the digital image, a wear edge of the wear part. In one embodiment, the model information for the wear part may identify one or more wear edges of the wear part that can be used to determine the degree of wear of the wear part. It may also indicate the general location (e.g., x-y coordinates) where one would expect to find the wear edge(s) in a digital image oriented in the same way as the model of the wear part. Using the model information, processor 200 may process the digital image to identify a wear edge and determine its precise position in the digital image. In the case of track link 300, for example, processor 200 may process the digital image to identify wear edge 306 (that engages the tractor wheels 308 during operation) and determine its location in the digital image. In one embodiment, processor 200 may define the wear edge as a line in the digital image.

Alternatively or additionally to processor 200 processing the image to identify the wear edge, wear parts application 218 may allow user 112 to visually define the location of the wear edge on the displayed digital image. For example, user 112 may use input device 206 to draw or place a line in image capture window 502 that identifies the position of the wear edge in the digital image. In the case of track link 300, for example, user 112 may input a line that is flush with wear edge 306. Processor 200 may then determine and store the position (e.g., coordinates, angle, etc.) of the input line for use in determining the degree of wear of the wear part.

In step 802, processor 200 may identify, in the digital image, one or more features of the wear part that serve as a basis to measure the wear edge and determine the degree of wear of the part. Step 802 may be similar to step 700 discussed above in connection with FIG. 7, and may involve identifying the same or different features of the wear part. In the case of track link 300, for example, processor 200 may identify in the digital image pin holes 302, 304, or the centers thereof, with the aid of model information for track link 300. (Depending upon the type of wear part, however, different types of wear part features may be identified.) In some cases, processor 200 may determine a line between the identified features of the wear part and may use the line as a basis for measuring the identified wear edge. In the case of track link 300, for instance, processor 200 may determine a line 312 between the centers of pin holes 302, 304 and use that line 312 as a basis for measuring wear edge 306, as explained above.

In step 804, processor 200 may measure, from the digital image, a value of a dimension of the wear part based on the wear edge identified in step 800 and on the feature(s) of the wear part identified in step 802. In one embodiment, processor 200 may do so by measuring a distance in pixels between the identified wear edge and the identified feature(s) or a line between the identified feature(s). In the case of track link 300, for instance, the particular dimension to be measured may be the distance 310 from a line 312 connecting the centers of pin holes 302, 304 and the line, identified by processor 200 in the digital image or input by user 112, defining wear edge 306. And processor 200 may determine the distance 310 by counting the number of pixels between those two lines.

In step 806, processor 200 may convert the measured value of the dimension to a "real-world" measurement based on the calibration factor calculated in step 706. In one embodiment, processor 200 may do so by multiplying the measured value by the calibration factor. Continuing with the track link example, processor 200 may have determined a distance 310 of 282 pixels between line 312 connecting the centers of pin holes 302, 304 and the line defining wear edge 306 and a calibration factor of 0.333 mm/pixel. Processor 200 may multiply 282 pixels×0.333 mm/pixel to obtain a distance 310 of about 94 mm between line 312 connecting the centers of pin holes 302, 304 and the line defining wear edge 306.

In step 808, processor 200 may determine the degree of wear of the wear part using the converted value determined in step 806. In one embodiment, processor 200 may look up the converted value in the wear table for the wear part to determine the degree of wear. For instance, in the case of track link 300, having determined a distance 310 of 94 mm between line 312 connecting the centers of pin holes 302, 304 and the line defining wear edge 306, processor 200 may look up 94 mm in the wear table (shown above) for track link 300 to determine that track link 300 is 30% worn.

Returning to FIG. 6, in step 614, mobile device 114 may display an indication of the degree of wear of the wear part determined in step 808. For example, processor 200 may animate wear indicator interface element 510 to illustrate the degree of wear. Continuing with the track link example, processor 200 may animate wear indicator interface element 510 to indicate that track link 300 is 30% worn, such as by illuminating three out of ten total bars of wear indicator interface element 510.

In step 616, mobile device 114 may optionally determine whether the degree of wear of the wear part is greater than a threshold, such as 70%. If the degree of wear is greater than the threshold, mobile device 114 may notify dealer system 108 (step 618), such as by sending a text message, e-mail, or other electronic message over network 109. As discussed above, the message may contain information about machine 110, the wear part, user 112, machine site 102, etc., that enables the dealer to assess the situation and take further action if warranted. Responsive to the message, dealer system 108 may contact user 112 to bring machine 110 to the dealer for inspection or service, may arrange for a technician to visit machine site 102 and inspect or service machine 110, or may prompt user 112 to order a replacement for the wear part and allow user 112 to order the same. Alternatively or additionally to notifying the dealer, mobile device 114 may display a warning, vibrate, sound an alert, or otherwise draw the attention of user 112 if the degree of wear is greater than a threshold.

Method 600 may end after completion of step 618 or after completion of step 616, in the event that mobile device 114 determines that the degree of wear is not greater than the threshold.

Figure 9:
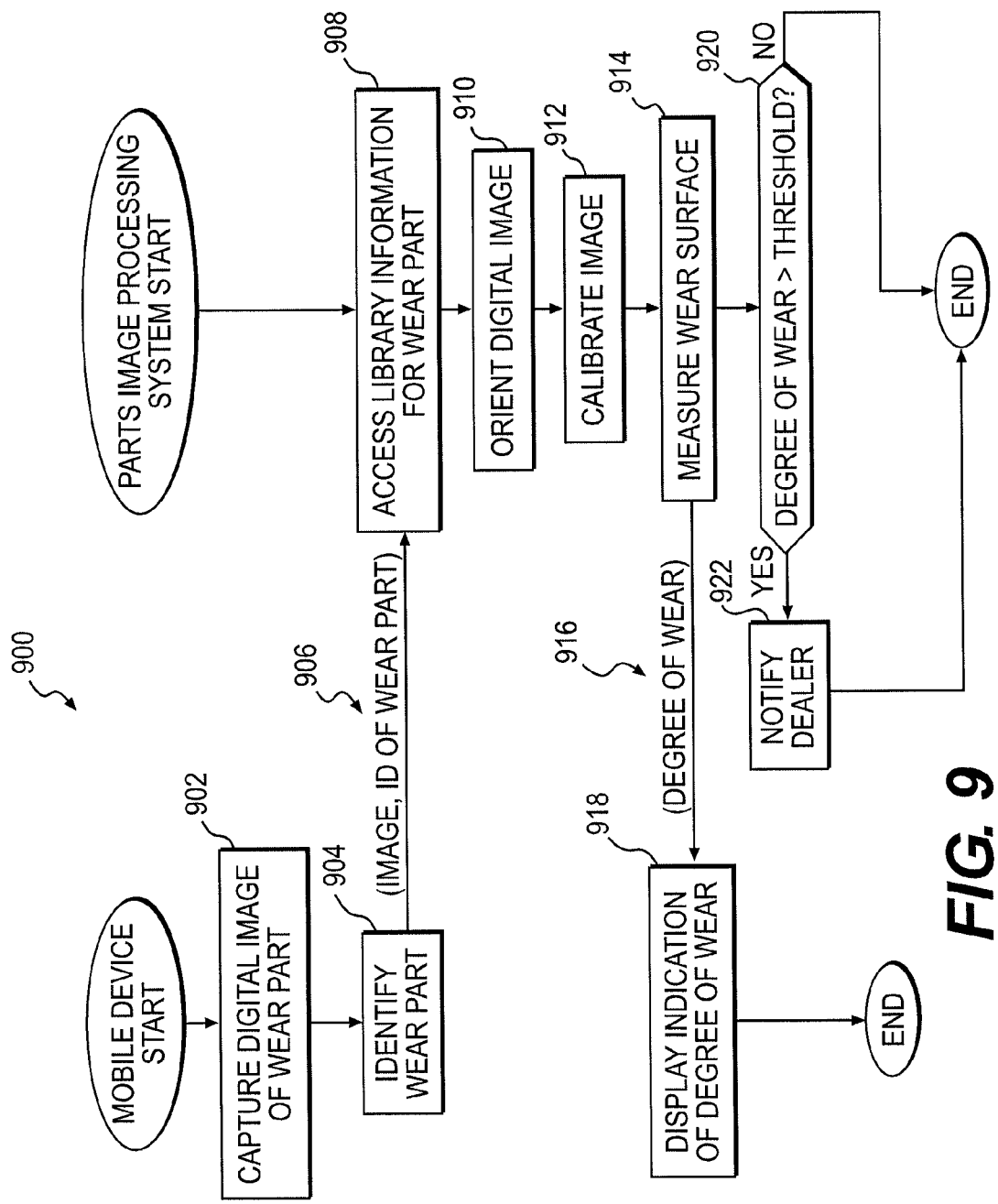
FIG. 9 is a flowchart of another exemplary method for determining the degree of wear of a wear part from a digital image, consistent with the disclosed embodiments.

FIG. 9 is a flowchart illustrating an exemplary method 900 for determining the degree of wear of a wear part from a digital image, in a "cloud" or "server" embodiment in which parts image processing system 104 handles image processing. The embodiment of FIG. 9 is similar to the embodiment of FIG. 6 except that processor 400 executing wear parts application 410 of parts image processing system 104 may perform functions or steps of method 900 that are handled by mobile device 114 in the embodiment of FIG. 6.

User 112 may use a browser of mobile device 114 to access, over network 109, a web page or web application associated with the parts image processing system 104's wear parts application 410. In step 902, user 112 may use the web page or application to capture a digital image of a wear part in a similar manner as described above in step 602. In step 904, user 112 may also use the web page or application to identify the wear part captured in the image, in a similar manner as described above in connection with step 604. In step 906, user 112 may use the web page or application to send the captured digital image and the identification of the wear part from mobile device 114, over network 109, to parts image processing system 104. Accordingly, as part of step 906, parts image processing system 104 may receive the captured image and the identification of the wear part from mobile device 114 over network 109.

In step 908, parts image processing system 104 may access model information contained in wear parts library 412 for the identified wear part, in a similar manner as described above in connection with step 606. In step 910, parts image processing system 104 may optionally orient the digital image of the wear part captured in step 902 to match the model information for the wear part, so that accurate measurements can be taken from it, in a similar manner as described above in connection with step 608. In step 912, parts image processing system 104 may additionally calibrate the digital image to determine a calibration factor for the digital image, in a similar manner as described above with respect to step 610. Additionally, in step 914, parts image processing system 104 may measure a wear edge of the wear part from the digital image, in a similar manner as described above with respect to step 612.

In step 916, parts image processing system 104 may send an indication of the determined degree of wear to mobile device 114 over network 109. Accordingly, as part of step 916, mobile device 114 may receive the indication over network 109. Additionally, in step 918, parts image processing system 104 may display the indication to user 112 as described above with respect to step 614. Additionally, in step 920, parts image processing system 104 may determine whether the degree of wear of the wear part is above a threshold, as described above with respect to step 616, and may notify the dealer (step 922) if so.

Figure 10:
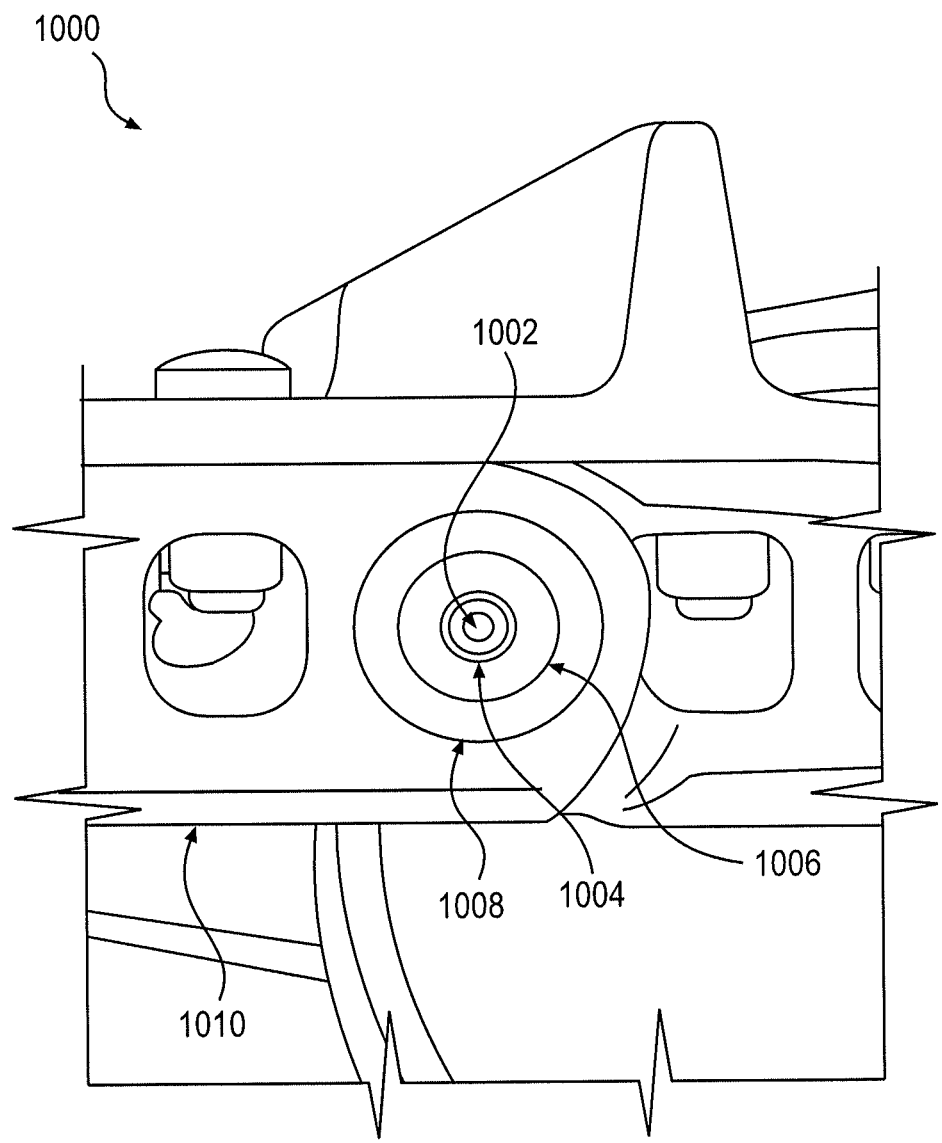
FIG. 10 is another representation of an exemplary wear part—a track link.

FIG. 10 is an alternate representation of a wear part, in this case, track link 1000, with certain characteristics highlighted to illustrate an alternate technique for determining wear. As shown in the figure, track link 1000 may have known features such as a pin hole center 1002, chamfer edge 1004, pin-link boundary 1006, cast surface boundary 1008, and wear edge 1010.

The distances between pin hole center 1002 and chamfer edge 1004, pin-link boundary 1006, cast surface boundary 1008, and wear edge 1010 may be stored in wear parts library 220 FIG. 2). Additionally, the distance from the pin hole center 1002 to wear edge 1010 when track link 1000 is determined to have reached 100% wear, and/or various other percentages of wear, may also be stored in wear parts library 220 (FIG. 2). The concentric circles composed of chamfer edge 1004, pin-link boundary 1006, and cast surface boundary 1008 may be applied within wear parts application 218 running on mobile device 114 to locate automatically pin center 1002 and calibrate the distance per pixel between the pin center 1002 and wear edge 1010 (and thereby determine the degree of wear).

Figure 11:
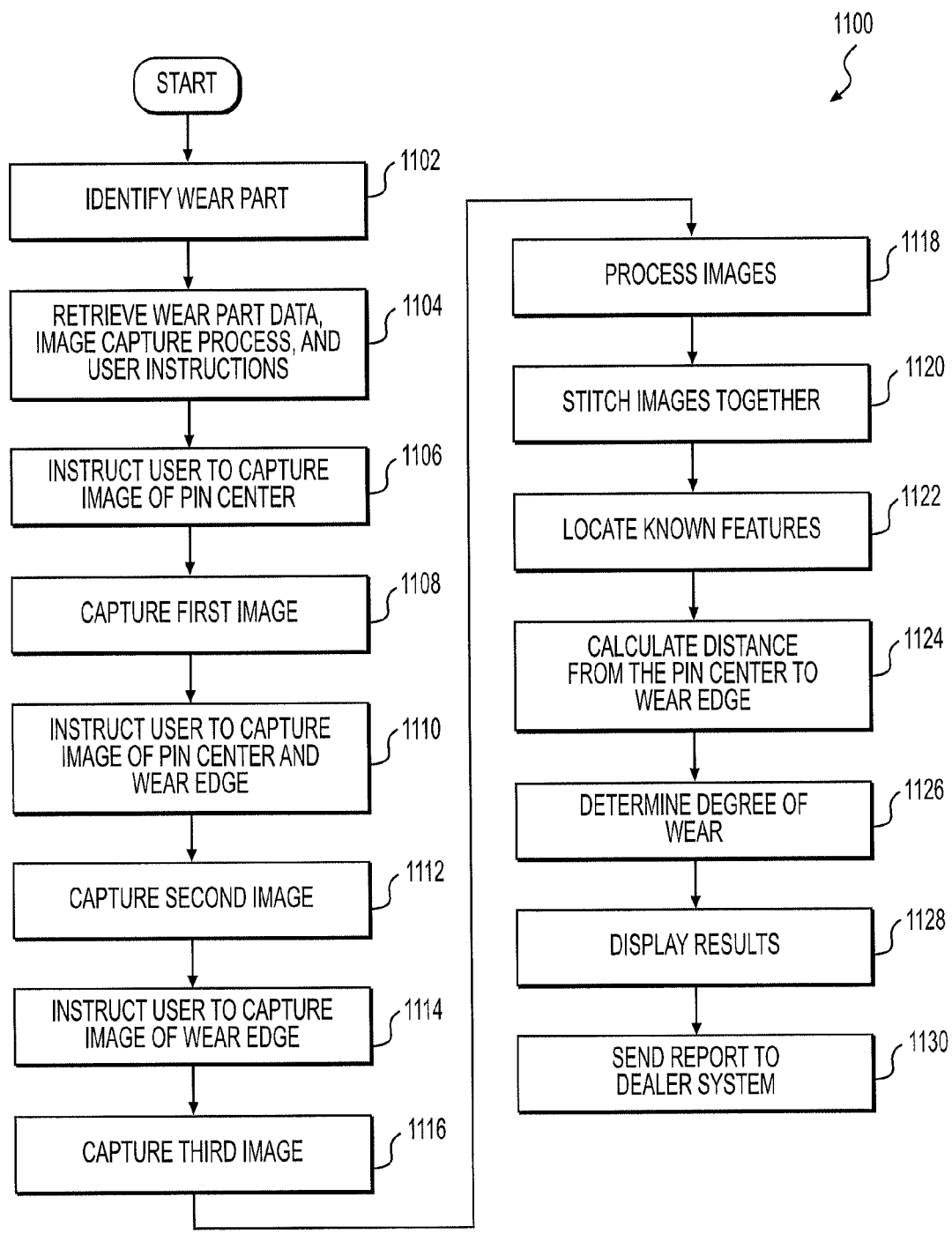
FIG. 11 is a flowchart describing an alternative method of determining the degree of wear of a wear part from a digital image, consistent with the disclosed embodiments.

FIG. 11 is a flowchart describing an alternative method 1100 of determining the degree of wear of a wear part from a digital image, consistent with the disclosed embodiments. Like method 600 in a "client-side" environment 100 in which mobile device 114 (rather than parts image processing system 104) handles image processing, processor 200 of mobile device 114 may perform method 1100 when executing wear parts application 218 on mobile operating platform 216. It is noted that, depending upon the desired implementation, steps of method 1100 may be performed in different orders or even omitted entirely. Aspects of method 1100 may also be performed in a "cloud" or "server" environment, similar to method 900, with parts image processing system 104 handling image processing and/or other steps of method 1100. The steps of method 1100 are intended to illustrate potential embodiments consistent with the disclosure rather than to limit the scope of the disclosure in any way.

In step 1102, a user of mobile device 114 identifies the wear part. For example, the user of mobile device 114 may input the part number and/or the machine serial number via wear parts application 218 using input device 206.

In step 1104, wear parts library 220 may be accessed to retrieve data for the wear part, the image capture process to be used for the wear part, and/or user instructions to properly capture a digital image of the wear part. For example, the dimensions of wear part discussed above in connection with FIG. 10 may be retrieved. Based on the characteristics of the wear part (e.g., size), specific image capture instructions may be stored in wear parts library 220. For example, smaller wear parts may only require a single image to capture all the information necessary to make the wear determination, while larger parts may require multiple images stitched together. The information retrieved in step 1104 may include a set of instructions and image overlays for the user. The instructions and image overlays direct the user how to position mobile device 114 and/or camera 212 in relation to the wear part to capture one or more digital images.

In step 1106, the user may be instructed to position mobile device 114 and/or camera 212 to capture an image of the wear part centered over pin hole center 1002. In one embodiment, mobile device 114, based on the information retrieved in step 1104, may display an overlay (e.g., a frame, outline, or crosshair) illustrating how to orient the wear part within image capture window 502 over pin hole center 1002.

In step 1108, once the user has positioned mobile device 114 and/or camera 212, the user may provide input to input device 206 (e.g., tap a capture image interface element 504 on the touchscreen) to initiate capturing a first digital image of the wear part, which will be discussed below in connection with FIG. 12.

In step 1110, using similar techniques as in step 1106, the user may be instructed to position mobile device 114 and/or camera 212 to capture an image of pin hole center 1002 and wear edge 1010. In one embodiment, the user may be instructed via an overlay (e.g., frame, outline, or crosshair) in image capture window 502 to position both pin hole center 1102 and wear edge 1010 within the view. For example, an overlaid cross hair may identify the desired position of pin hole center 1002, and an overlaid line may identify the desired position of wear edge 1010.

In step 1112, once the user has positioned mobile device 114 and/or camera 212 as instructed, the user may provide input to input device 206 (e.g., tap a capture image interface element 504 on the touchscreen) to initiate capturing a second digital image of the wear part, as will be discussed below in connection with FIG. 12.

In step 1114, using similar techniques as in steps 1106 and 1110, the user may be instructed to position mobile device 114 and/or camera 212 to capture an image of wear edge 1010. In one embodiment, the user may be directed to position mobile device 114 and/or camera 212 in order to align an image overlay (e.g., a frame, outline, or crosshair) with wear edge 1010 within image capture window 502. Additionally, the user may be instructed to position mobile device 114 and/or camera 212 closer to or farther from the wear part so that wear edge 1010 is in the center of image capture window 502 and at least a portion of the circular arc(s) defined by chamfer edge 1104, pin-link boundary 1106, and/or cast surface boundary 1108 are in the image. This adjustment of focal distance may be used to accomplish the image stitching in step 1120, discussed below.

In step 1116, once the user has positioned mobile device 114 and/or camera 212 as instructed, the user may provide input to input device 206 (e.g., tap a capture image interface element 504 on the touchscreen) to initiate capturing a third digital image of the wear part, as will be discussed below in connection with FIG. 12.

In step 1118, the first, second, and third images captured in the preceding steps may be processed. Various types of image processing known in the art may be performed to prepare the images for the wear determination. For example, wear parts application 218 may correct the images for lens distortion. The distortion correction may be accomplished by techniques known in the art, such as through a one-time calibration or a correction based on an algebraic lens distortion model.

In step 1120, once the images have been processed, wear parts application 218 may stitch the images together. The stitching may be done according to various techniques known in the art, such as by applying known algorithms to leverage invariant features among the images.

In step 1122, the known features of the wear part may be located in the images. For example, pin hole center 1002, wear edge 1010, and any of chamfer edge 1004, pin-link boundary 1006, or cast surface boundary 1008 may be located in the stitched digital images. Because the user was instructed to position mobile device 114 and/or camera 212 in a specific manner for the different images, wear parts application 218 may use that information identify one or more of these features. For example, wear parts application 218 may apply an arc-origin-finding algorithm to identify pin hole center 1002; a polar plot edge detection algorithm to identify any of chamfer edge 1004, pin-link boundary 1006, or cast surface boundary 1008; and standard edge detection to identify wear edge 1010. As a result of step 1122, location information for pin hole center 1002, wear edge 1010, and any of chamfer edge 1004, pin-link boundary 1006, or cast surface boundary 1008 may be determined.

In step 1124, using the location information derived in step 1122 along with information in wear parts library 220, wear parts application 218 may calculate a distance from pin hole center 1002 to wear edge 1010. In one embodiment, the ratio of the pixel distance and/or physical distance between pin hole center 1002 to the arc boundary of any of chamfer edge 1004, pin-link boundary 1006, or cast surface boundary 1008 may be determined. That ratio may then be compared to the pixel distance from pin hole center 1002 to wear edge 1010 to calculate the physical distance from pin hole center 1002 to wear edge 1010.

In step 1126, the distance from pin hole center 1002 to wear edge 1010 may be compared to the wear table for the wear part stored in wear parts library 220. Based on the comparison, the percentage or degree of wear of the wear part may be determined, as described above. The percentage or degree of wear may then be displayed on mobile device 114 in step 1128, as discussed above in connection with FIG. 5.

In some embodiments, the results of step 1126 may be sent to dealer system 108 over network 109 using mobile device 114's wireless network communication interface 210. For example, the wear percentage or degree, part number, part serial number, and/or machine serial number may be transferred. Additionally, mobile device 114 may transfer the captured images, the time required to complete the wear determination, and image processing performance information for steps 1108, 1112, and 1116-1122.

Figure 12:
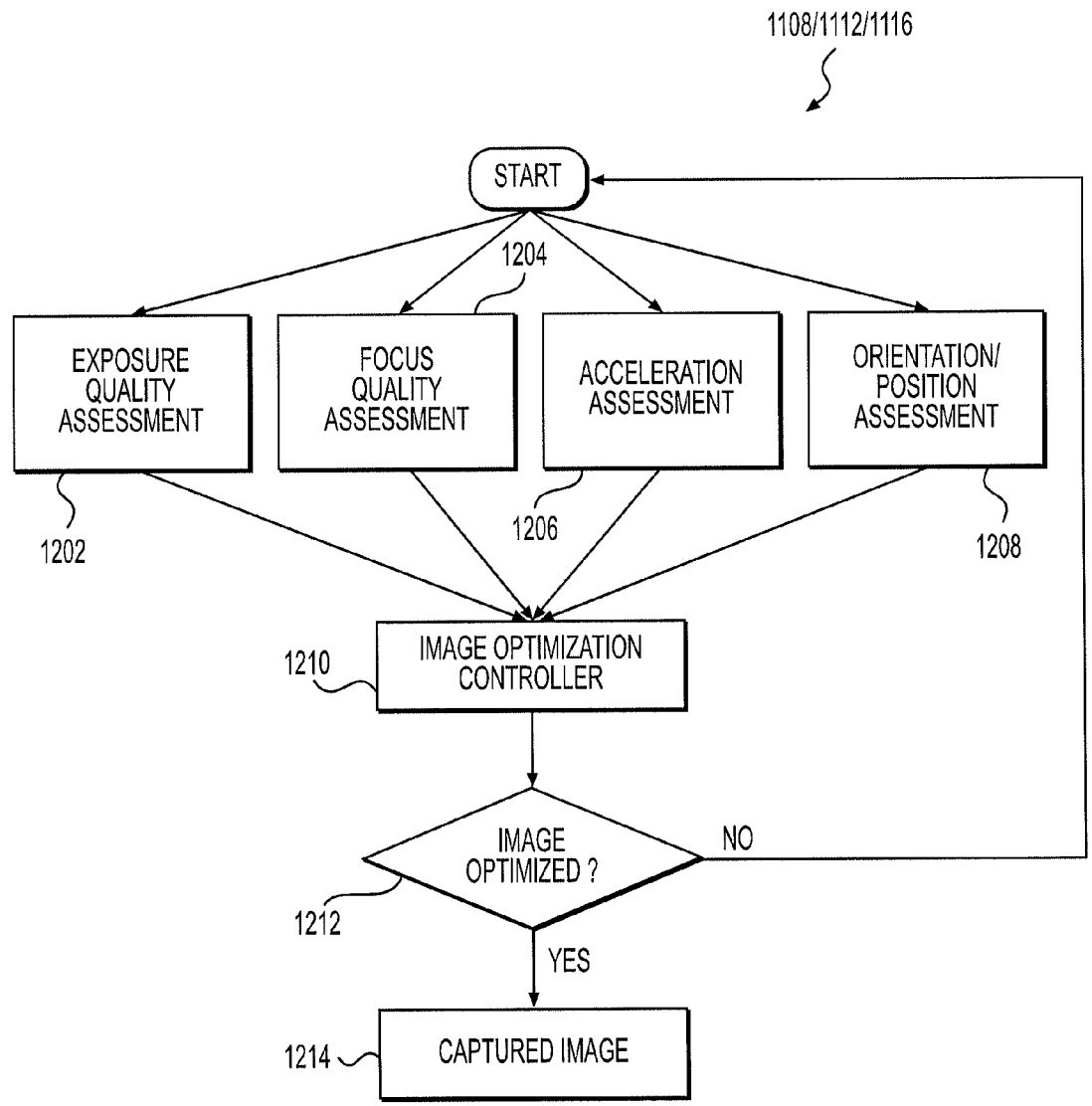
FIG. 12 is a representation of an exemplary image-capturing process, consistent with the disclosed embodiments.

FIG. 12 is a representation of image capturing steps 1108, 1112, and 1116 in greater detail. These steps may include various assessments to confirm whether the image (currently in the image capture window 502 of mobile device 114) is suitable for the wear determination and, thus, should be captured. In one embodiment, an exposure quality assessment process 1202, a focus quality assessment process 1204, an acceleration assessment process 1206, and an orientation/position assessment process 1208 may be performed. They may be performed simultaneously or in a sequence. It is to be appreciated, however, that additional, fewer, and/or different image assessments may be made as part of image capture, if desired. In one embodiment, each assessment process 1202-1208 may output a value indicating whether it has assessed the image as suitable for the wear part determination (e.g., yes or no, 0 or 1, or a value between 1 and 10)

Exposure quality assessment process 1202 may assess the exposure quality of the image and report a value indicating whether the image exposure is suitable for the wear determination. In one embodiment, it may analyze the distribution pixel darkness in the image to determine whether the image is underexposed or overexposed and output a value indicating the same (e.g., yes or no, 0 or 1, or a value between 1 and 10). If the image is underexposed, exposure quality assessment process 1202 may alternatively report a recommendation to increase the f-stop or turn on the flash of camera 212. If the image is overexposed, it may send a recommendation to reduce the f-stop, turn off the flash, or shield the lens.

Focus quality assessment process 1204 may check whether mobile device 114's processor indicates that lens focus has been obtained. Once lens focus is obtained, focus quality assessment process 1204 may optionally assess focus based on image frequency entropy in a sample region of the image or by other means. In any event, focus quality assessment process 1204 may output a value indicating whether proper focus has been obtained for the wear determination (e.g., yes or no, 0 or 1, or a value between 1 and 10).

If mobile device 114 contains an accelerometer, acceleration assessment process 1206 may determine whether the mobile device 114's current acceleration might inhibit capturing an image that is suitable for the wear determination. In one embodiment, it may report the current acceleration of mobile device 114 along with a value indicating whether it expects the image to be of suitable quality for making a wear determination based on the amount of acceleration (e.g., yes or no, 0 or 1, or a value between 1 and 10).

Orientation/position assessment process 1208 may determine the orientation of the image and output a value indicating whether the image is properly oriented for performing the wear determination. For example, orientation/position assessment process 1208 may determine that the user is nominally aligning camera 212 to the wear part in prescribed relative positions and orientations. In step 1106, for example, orientation/position assessment process 1208 may capture intermediate images and measure the elliptical distortion in the arc boundary of any of chamfer edge 1004, pin-link boundary 1006, or cast surface boundary 1008. In one embodiment, orientation/position assessment process 1208 may apply a specialized algorithm that reduces the image processing required to identify the pin hole center 1002 and the edge representation of the arc(s). Then, it may apply standard elliptical measurement techniques to output its orientation/position assessment (e.g., yes or no, 0 or 1, or a value between 1 and 10).

Orientation/position assessment process 1208 may quickly assess the placement of mobile device 114 and/or camera 212 with respect to wear edge 1010. For some wear parts, the wear edge 1010 desired to be captured in the image may be closer to the lens of camera 212 than background objects adjacent the wear edge 1010 that are also in the image. This may cause variations in hue, saturation, and brightness on either side of the wear edge 1010 in the image. Accordingly, in one embodiment, orientation/position assessment process 1208 may average the hue, saturation, and/or brightness values on both sides of wear edge 1010 and in strips parallel to the expected wear edge 1010. And orientation/position assessment process 1208 may assess that the image is properly oriented/positioned based on an agreement of the averaged values on either side of the expected wear edge 1010.

An image optimization controller process 1210 may receive the assessment values output by assessment processes 1202-1208. In one embodiment, image optimization controller process 1210 may weigh and track the values over time, adjust control settings, and/or give directions to the user to alter the conditions under which the image is being captured. Image optimization controller 1210 may analyze the weighted assessments over time to determine when the picture is optimized (step 1212) (i.e., suitable for the wear determination) and then capture the image (step 1214). Of course, as reflected in FIG. 12, the assessment processes 1202-1208 may continue until image optimization process 1210 determines that the image is optimized and suitable for the wear determination.

In one embodiment, processes 1202-1214 may be implemented by mobile device 114's processor 200 executing software modules of wear parts application 218 in a "client-side" embodiment. In "cloud" or "server" environments, the captured image(s) may be sent to parts image processing system 104, and processor 400 executing software modules of wear parts application 410 may perform processes 1202-1212 and then transmit an indication to mobile device 114 whether the captured image is suitable for the wear determination or whether the user should capture another image.

INDUSTRIAL APPLICATION

The disclosed systems and methods find application in any environment in which a user wishes to determine the degree of wear of a wear part. By using a mobile device to capture a digital image of the wear part and determine the degree of wear of the part from the digital image, the disclosed systems and methods allow the user to easily assess the part without necessarily having detailed knowledge about the part, its wear characteristics, or the machine.

For example, a user 112 of environment 100 may operate a tractor at a worksite. Upon traversing steep terrain, the tracks 116 of the tractor may slip from the teeth that engage the tracks to the tractor's wheels 308 (FIG. 3). Hearing the noise, the operator may stop the tractor, dismount, and examine the track that slipped. Finding a track link 300 that appears damaged, the operator may pull out his or her mobile device 114 and launch a wear parts application 218 (FIG. 2) installed on it. The operator may orient the mobile device 114 and its camera 212 (FIG. 2) so that the track link 300 is displayed inside an image capture window 502 (FIG. 5) of the wear parts application 218. The operator may proceed to capture a digital image of the track link 300 by selecting a capture image interface element 504 of the application, and may identify the track link 300 to the application via find part interface element 506. The operator may then select a determine wear interface element 508 of the application, in response to which mobile device 114 may determine from the digital image that the track link 300 is 80% worn and display an indication of the same via a wear indictor interface element 510 of the application. At the same time, mobile device 114 might also send a message to dealer system 108 over the network 109 so that the dealer can schedule a service appointment with the operator to replace the track link 300.

The disclosed techniques have additional application as well. For example, mobile device 114 and/or parts image processing system 104 may determine a degree of "sag" of tracks 116 from a digital image thereof. As tracks 116 wear, they may slowly sag over time in the center (between the wheels) from an initial height when they are new. Accordingly, a model and/or wear table for tracks 116 (when new) may be contained in wear parts library 218 and/or 412. The model and/or wear table may define an amount of sag for tracks 116 as a function of a degree of wear of the tracks 116, e.g., from 0% worn (new) to 100% worn. For example, the model and/or wear table may define the sag as a measured distance from a specified initial height of the center of tracks 116 (when they are new) to a measured (i.e., current) height of the center of tracks 116 as measured from the digital image, that is, a change in height of tracks 16. In some embodiments, a known feature of tracks 116 or machine 116 may serve as a reference point to measure the height of tracks 116 from the digital image. As an example, a sag of 10 mm may correspond to a 20% wear. Environment 100 may perform many of the same functions described above in connection with determining the degree of sag of tracks 116.

One of ordinary skill in the art will appreciate that computer programs for implementing the disclosed techniques may be stored on and/or read from computer-readable storage media. The computer-readable storage media may have stored thereon computer-executable instructions which, when executed by a computer processor, cause the computer to perform, among other things, processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of environment 100 (FIG. 1).

While illustrative embodiments of the invention have been described herein, the scope of the invention includes any and all embodiments having equivalent elements, modifications, omissions, combinations (e.g., of aspects across various embodiments), adaptations, and/or alterations as would be appreciated by those in the art based on the present disclosures. The limitations in the claims are to be interpreted broadly based on the language employed in the claims and not limited by examples described in the present specification or during the prosecution of the application. Further, the steps or processes of the disclosure may be modified in any manner, including by reordering steps, inserting steps, deleting steps, or having steps or functions performed by other entities of environment 100, without departing from the principles of the disclosure.

Additionally, for example, known dimensions of features of a wear part may be used to calibrate a digital image. For example, in the case of a track link 300, pin holes 302, 304 may have known diameters, a pin plug may have a known diameter, a pin center chamfer may have a known diameter, a link bore may have a known diameter, and/or a link spotface may have a known diameter. Any of these known diameters or other dimensions of a wear part may be compared to pixel-based measurements of the same, taken from a digital image of the part, to obtain the above-described calibration factor.

It is intended, therefore, that the specification and examples be considered as exemplary only, with a true scope and spirit of the disclosure being indicated by the following claims and their full scope of equivalents.

What is claimed is:

1. A mobile device configured for determining part wear, comprising:
   a camera;
   an input device for receiving input from a user of the mobile device;
   a storage device storing an application; and
   a processor configured to execute the stored application to:
      receive, via the input device, a command from the user to capture an image;

capture, using the camera and responsive to the command, at least one digital image of a wear part of a machine;

identify, in the at least one digital image, a wear edge of the wear part;

identify, in the at least one digital image, at least one feature of the wear part;

measure, in the at least one digital image, the wear edge of the wear part; and determine the degree of wear of the wear part based upon the measurement of the wear edge, wherein, to measure the wear edge, the processor is further configured to:

measure, in the at least one digital image, a value of a dimension of the wear part based on the identified wear edge and on the identified at least one feature, wherein measuring a value of a dimension of the wear part includes measuring a distance from a line connected with the identified at least one feature and a line defining the identified wear edge in the at least one digital image.

2. The mobile device of claim 1, wherein to measure a distance, the processor is further configured to execute the stored application to determine a number of pixels between the line connected with the identified at least one feature and the line defining the identified wear edge in the at least one digital image.

3. The mobile device of claim 1, further including:

a wear table stored in the storage device that defines the degree of wear of the wear part as a function of the dimension;

wherein the processor is further configured to execute the stored application to:

look up the measured value of the dimension of the wear part in the wear table; and determine the degree of wear of the wear part based on the lookup.

4. The mobile device of claim 1, wherein the processor is further configured to execute the stored application to:

calibrate the at least one digital image;

convert the measurement based on the calibration; and determine a degree of wear of the wear part based on the converted measurement.

5. The mobile device of claim 1, further comprising:

a display device;

wherein the processor is further configured to execute the stored application to display an indication of the determined degree of wear of the wear part on the display device.

6. The mobile device of claim 1, further comprising:

a network communication interface configured to communicate over an electronic communication network;

wherein the processor is further configured to execute the stored application to:

determine whether the degree of wear is greater than a threshold; and send, over the electronic communication network and based upon a determination that the degree of wear is greater than the threshold, a notification to a dealer system associated with the machine.

7. The mobile device of claim 4, further comprising:

specification information for the wear part, stored in the storage device, the specification information specifying a known distance between a first feature of the wear part and a second feature of the wear part;

wherein the processor is further configured to execute the stored application to:

identify, in the at least one digital image, the first feature and the second feature of the wear part;

measure, in the at least one digital image, a distance between the first feature and the second feature;

determine the known distance between the first feature and the second feature based on the stored specification information for the wear part;

calculate a calibration factor based on the measured distance and the known distance; and convert the measurement based on the calibration factor.

* * * * *